(12) United States Patent
Bonifacio et al.

(10) Patent No.: US 11,359,858 B2
(45) Date of Patent: Jun. 14, 2022

(54) METHOD FOR LIQUEFYING AMMONIA

(71) Applicant: L'Air Liquide, Societe Anonyme pour l'Etude et l'Exploitation des Procedes Georges Claude, Paris (FR)

(72) Inventors: Abigail Bonifacio, Vallejo, CA (US); Vincent Follaca, Houston, TX (US); Pierre-Philippe Guerif, Houston, TX (US); Alain Guillard, Houston, TX (US)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 234 days.

(21) Appl. No.: 16/731,034

(22) Filed: Dec. 31, 2019

(65) Prior Publication Data

US 2021/0199376 A1    Jul. 1, 2021

(51) Int. Cl.
*F25J 1/00* (2006.01)

(52) U.S. Cl.
CPC .......... *F25J 1/0002* (2013.01); *F25J 1/0095* (2013.01)

(58) Field of Classification Search
CPC ....... F25B 9/008; F25B 15/006; F25J 1/0047; F25J 1/005; F25J 1/0022; F25J 1/0095; F25J 1/052; F25J 2210/20; F25J 2210/90; F25J 2215/20; F25J 2260/80; F25J 2270/12; F25J 2270/18; F25J 2270/60; F25J 2270/90; F25J 2270/902
See application file for complete search history.

(56) References Cited

U.S. PATENT DOCUMENTS

| 5,555,738 A * | 9/1996 | DeVault | F01K 23/10 62/238.3 |
| 9,062,608 B2 | 6/2015 | Allam et al. | |
| 2008/0006053 A1 * | 1/2008 | Bauer | F25J 1/0292 62/612 |
| 2016/0069262 A1 * | 3/2016 | Allam | F25J 3/04618 60/783 |

* cited by examiner

*Primary Examiner* — Jianying C Atkisson
*Assistant Examiner* — Erik Mendoza-Wilkenfel
(74) *Attorney, Agent, or Firm* — Justin K. Murray

(57) ABSTRACT

A method for liquefying ammonia can include the steps of: providing a pressurized carbon dioxide stream from a power generating facility; expanding the pressurized carbon dioxide stream to a lower pressure that is sufficient to produce a dual phase carbon dioxide fluid; introducing the dual phase carbon dioxide fluid to a gas-liquid separator; withdrawing a liquid stream from the gas-liquid separator; and liquefying an ammonia gas stream in an ammonia liquefier by indirect contact with the liquid stream from the gas-liquid separator, thereby forming a liquid ammonia stream and a gaseous carbon dioxide stream.

13 Claims, 1 Drawing Sheet

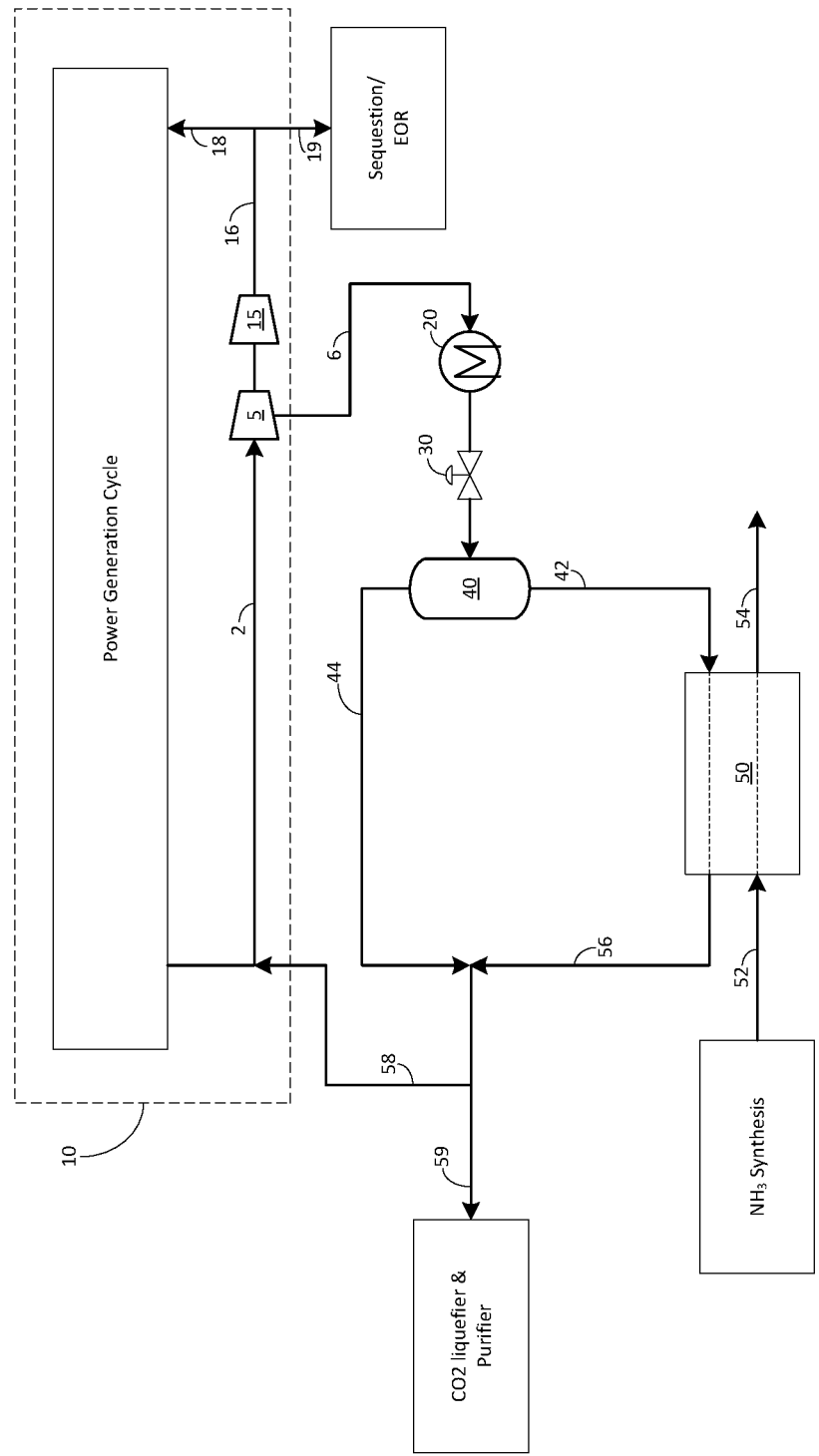

METHOD FOR LIQUEFYING AMMONIA

TECHNICAL FIELD OF THE INVENTION

The present invention generally relates to an apparatus and method for producing liquid ammonia. More particularly, the present invention utilizes a pressurized carbon dioxide stream from a power generating facility to provide let-down energy that is used to liquefy the ammonia without the use of an ammonia refrigeration cycle.

BACKGROUND OF THE INVENTION

Typical ammonia production process include a chiller to cool the ammonia product down to liquid state so it can be stored in a liquid storage. The ammonia product liquefaction is usually happening around atmospheric pressure, which corresponds to a liquefaction temperature around −32° C. The chiller is of mechanical type and uses a side stream of ammonia as refrigeration fluid in the chiller unit, which is following a classical compression/expansion refrigeration cycle.

Compression is achieved through a refrigeration compressor. Such set-up is particularly thermodynamically efficient as it makes use of the high latent heat of the refrigeration fluid to liquefy the ammonia product. However, this method requires the addition of costly turbomachinery equipment, in particular a compressor driven by a motor.

Therefore, it would be desirable to have an improved apparatus and method that reduces and/or eliminates the need for an ammonia compressor as part of an ammonia liquefier.

SUMMARY OF THE INVENTION

The present invention is directed to a method and apparatus that satisfies at least one of these needs. Certain embodiments of the current invention propose to use a pressurized carbon dioxide stream from a power producing facility to provide let-down energy that is used to liquefy the ammonia without the use of an ammonia refrigeration cycle.

In one embodiment, a method for liquefying ammonia can include the steps of: providing a pressurized carbon dioxide stream from a power generating facility; expanding the pressurized carbon dioxide stream to a lower pressure that is sufficient to produce a dual phase carbon dioxide fluid; introducing the dual phase carbon dioxide fluid to a gas-liquid separator; withdrawing a liquid stream from the gas-liquid separator; and liquefying an ammonia gas stream in an ammonia liquefier by indirect contact with the liquid stream from the gas-liquid separator, thereby forming a liquid ammonia stream and a gaseous carbon dioxide stream.

In optional embodiments of the method for liquefying ammonia:
the pressurized carbon dioxide stream is withdrawn from a carbon dioxide cycle compressor within the power generating facility;
the method further includes the step of cooling the pressurized carbon dioxide stream upstream the step of expanding the pressurized carbon dioxide stream;
the pressurized carbon dioxide stream is cooled using a cooling medium selected from the group consisting of cooling water, air, and combinations thereof;
the pressurized carbon dioxide stream is expanded to the lower pressure using a Joule-Thompson valve;
the method further includes the steps of combining the gaseous carbon dioxide stream from the ammonia liquefier with a gas from the gas-liquid separator to form a combined carbon dioxide gas stream;
the method further includes the step of recycling said combined carbon dioxide gas stream to the power generating facility;
the lower pressure is selected based on matching an inlet pressure of a carbon dioxide cycle compressor of the power generating facility;
the method further includes the step of introducing said combined carbon dioxide gas stream to a carbon dioxide pipeline, wherein the lower pressure is selected based on a pipeline pressure of the carbon dioxide pipeline;
the method further includes the step of introducing said combined carbon dioxide gas stream to a carbon dioxide liquefaction plant;
the lower pressure is at a suitable pressure for liquefaction of carbon dioxide without the need for a $CO_2$ feed compressor, such that the carbon dioxide liquefaction plant comprises an absence of a $CO_2$ feed compressor;
the method further includes adjusting a flow rate of the pressurized carbon dioxide stream provided from the power generating facility, wherein the flow rate is adjusted according to match a quantity of ammonia to liquefy;
the liquid stream from the gas-liquid separator is fully vaporized within the ammonia liquefier; and/or
the ammonia gas stream is liquefied without using refrigeration provided by an ammonia refrigeration cycle.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying FIGURE. It is to be expressly understood, however, that the FIGURE is provided for the purpose of illustration and description only and is not intended as a definition of the limits of the present invention.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

The FIGURE shows an embodiment of the present invention.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

Some systems for power generation are using $CO_2$ produced by oxycombustion of natural gas as a circulating working fluid such as the Allam cycle described in U.S. Pat. No. 9,062,608. This $CO_2$ is compressed up to a certain pressure by a $CO_2$ Cycle Compressor (1) that can contain one or more compression stages. The pressurized $CO_2$ is then expanded inside a turbine, which is driving an electrical generator. The excess $CO_2$ can be removed from the system specifically to be sent to Enhanced Oil Recovery (EOR) or storage under pressure. These power generation cycles and storage/EOR systems include other process steps and equipment; however, they will not be described in further detail as they are not germane to embodiments of the present invention.

Certain embodiments of the present advantageously take advantage of this existing pressurized carbon dioxide stream in an effort to reduce or eliminate the need for an ammonia refrigeration cycle. As such, certain embodiments of the invention are able to produce liquid ammonia at a much-reduced operational cost since there are reduced or no compression costs tied specifically to the ammonia liquefier. Furthermore, the capital expenditures are greatly reduced since no additional refrigeration cycle equipment is needed (i.e., expensive compressors).

In one embodiment, a side stream of pressurized $CO_2$ can be diverted at an intermediate stage or at the outlet of the $CO_2$ compressor (1) and turned to liquid state. This happens by flash of the $CO_2$ streams within a Joule-Thompson (3) valve. An example of resulting flash ratios can be found in Table I below

TABLE I

Flash Ratios of Carbon Dioxide

| $CO_2$ temperature before JT valve (° C.) | 31 | 20 | 31 |
| --- | --- | --- | --- |
| $CO_2$ pressure before JT valve (bar a) | 74 | 74 | 80 |
| Vapor fraction after flash to 30 bar | 0.69 | 0.27 | 0.47 |

As seen in Table I, the $CO_2$ vapor fraction can be further reduced by reducing the $CO_2$ temperature upstream of the JT valve. As non-limiting examples, this cooling can be done via a heat exchanger using a cooling medium, such as cooling water or air. The resulting dual phase stream is preferably separated into separate liquid and gas streams using a gas-liquid separator. The liquid stream, which is at about −5° C. for the examples shown in Table I, is then used to liquefy ammonia gas via indirect heat exchange in a heat exchanger.

With the carbon dioxide liquid stream having a temperature of about 5° C., the resulting liquefied ammonia product can have a temperature that is close to 0° C. The resulting equilibrium pressure for this example would be around 4 bar. Liquefied ammonia product can then be stored into low-pressure storage.

The use of carbon dioxide for the liquefaction of ammonia is particularly useful due to a particular range of $CO_2$ vaporization pressures that efficiently match the $NH_3$ liquefaction pressure, which ultimately allows removal of an ammonia cycle compressor.

In another embodiment, a vapor $CO_2$ stream exiting the heat exchanger can be combined with the $CO_2$ gas exiting the $CO_2$ gas/liquid separator. Preferably, the $CO_2$ letdown pressure of the $CO_2$ stream used to liquefy $NH_3$ can be adjusted to fit with any $CO_2$ compression stage inlet or discharge pressure of the power generating facility.

In another embodiment, the following pressure adjustments are possible. The combined stream of $CO_2$ can then be sent to one or several of the following:
- at the inlet of the $CO_2$ Cycle Compressor. In that case, the $CO_2$ let down pressure can be chosen to match the inlet pressure of the $CO_2$ Cycle Compressor;
- at the inlet of the Pipeline for EOR or storage. In that case, the $CO_2$ let down pressure can also be chosen to match the Pipeline Pressure; and/or
- at the inlet of a $CO_2$ liquefaction plant.

A $CO_2$ liquefaction plant usually has a feed compressor to boost the $CO_2$ stream from low pressure (typically 1.5 bar) to a suitable pressure for the $CO_2$ liquefaction (typically between 15 and 30 bar). The $CO_2$ let down pressure can be chosen to match the suitable pressure for $CO_2$ liquefaction and therefore avoid the need of the $CO_2$ feed compressor.

In another embodiment, once the letdown pressure of the $CO_2$ stream used to liquefy $NH_3$ is chosen as per the above, the flowrate of this $CO_2$ stream can be adjusted to match the quantity of $NH_3$ to liquefy. In other words, for a given pressure and temperature of the $CO_2$ stream used to liquefy the $NH_3$, the flowrate can be adjusted to match the amount of $NH_3$ to be liquefied.

Referring to The FIGURE, within power production facility 10, carbon dioxide 2 is withdrawn from the power generation cycle and pressurized in compressors 5, 15 to produce pressurized carbon dioxide 16. A first portion 18 is sent back to the power generation cycle for use therein, while a second portion 19 can be used for EOR or sequestration.

In the embodiment shown, partially compressed carbon dioxide 6 is withdrawn from an intermediate stage of compressor 5 and power production facility 10 before being optionally cooled in cooler 20 before it is expanded across JT valve 30. The expansion results in a lower temperature and the formation of a dual phase fluid (see e.g., Table I). This dual phase fluid is then introduced to gas liquid separator 40, so that the liquid 42 can be separately used as a refrigeration fluid for liquefying ammonia gas 52 within ammonia liquefier 50, thereby producing liquid ammonia 54 and vaporized carbon dioxide 56.

In the embodiment shown, the top gas 44 can be combined with the vaporized carbon dioxide 56 and either sent to a $CO_2$ liquefier and purified via line 59, or recycled back to the power production facility via line 58. In the embodiment shown, the $CO_2$ liquefier advantageously does not need a carbon dioxide compressor, since the vaporized carbon dioxide 59 is already at a sufficiently high enough pressure.

Those of ordinary skill in the art will recognize that the location at which partially compressed carbon dioxide 6 is withdrawn from compressors 5, 15 can depend upon expansion ratio needed to produce a suitable amount of refrigeration for liquefaction of the ammonia gas 52, as well as whether the vaporized carbon dioxide 56 will be sent to the $CO_2$ liquefier or back to the power production facility 10.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

We claim:

1. A method for liquefying ammonia, the method comprising the steps of:
   providing a pressurized carbon dioxide stream from a power generating facility;
   expanding the pressurized carbon dioxide stream to a lower pressure that is sufficient to produce a dual phase carbon dioxide fluid;
   introducing the dual phase carbon dioxide fluid to a gas-liquid separator;
   withdrawing a liquid stream from the gas-liquid separator;
   liquefying an ammonia gas stream in an ammonia liquefier by indirect contact with the liquid stream from the gas-liquid separator, thereby forming a liquid ammonia stream and a gaseous carbon dioxide stream; and
   combining the gaseous carbon dioxide stream from the ammonia liquefier with a gas from the gas-liquid separator to form a combined carbon dioxide gas stream.

2. The method as claimed in claim 1, wherein the pressurized carbon dioxide stream is withdrawn from a carbon dioxide cycle compressor within the power generating facility.

3. The method as claimed in claim 1, further comprising the step of cooling the pressurized carbon dioxide stream prior to the step of expanding the pressurized carbon dioxide stream.

4. The method as claimed in claim 3, wherein the pressurized carbon dioxide stream is cooled using a cooling medium selected from the group consisting of cooling water, air, and combinations thereof.

5. The method as claimed in claim 1, wherein the step of expanding the pressurized carbon dioxide stream to the lower pressure is done so using a Joule-Thompson valve.

6. The method as claimed in claim 1, further comprising the step of recycling said combined carbon dioxide gas stream to the power generating facility.

7. The method as claimed in claim 1, wherein the lower pressure is selected based on matching an inlet pressure of a carbon dioxide cycle compressor of the power generating facility.

8. The method as claimed in claim 1, further comprising the step of introducing said combined carbon dioxide gas stream to a carbon dioxide pipeline, wherein the lower pressure is selected based on a pipeline pressure of the carbon dioxide pipeline.

9. The method as claimed claim 1, in further comprising the step of introducing said combined carbon dioxide gas stream to a carbon dioxide liquefaction plant.

10. The method as claimed in claim 9, wherein the lower pressure is at a suitable pressure for liquefaction of carbon dioxide without the need for a $CO_2$ feed compressor, such that the carbon dioxide liquefaction plant comprises an absence of a $CO_2$ feed compressor that compresses the combined carbon dioxide gas stream.

11. The method as claimed in claim 1, further comprising adjusting a flow rate of the pressurized carbon dioxide stream provided from the power generating facility, wherein the flow rate is adjusted according to match a quantity of ammonia to liquefy.

12. The method as claimed in claim 10, wherein the liquid stream from the gas-liquid separator is fully vaporized within the ammonia liquefier.

13. The method as claimed in claim 1, wherein the ammonia gas stream is liquefied without using refrigeration provided by an ammonia refrigeration cycle.

* * * * *